United States Patent
Kim et al.

(10) Patent No.: US 11,130,571 B2
(45) Date of Patent: Sep. 28, 2021

(54) UNMANNED AERIAL VEHICLE INCLUDING FLIGHT AND PHOTOGRAPHING CONTROL DEVICE

(71) Applicants: 4DREAM CO., LTD., Andong-si (KR); Won-Kug Kim, Andong-si (KR); Ki-Il Ryu, Chuncheon-si (KR); Jin-Kyo Shin, Seongnam-si (KR)

(72) Inventors: Won-Kug Kim, Andong-si (KR); Ki-Il Ryu, Chuncheon-si (KR); Jin-Kyo Shin, Seongnam-si (KR)

(73) Assignee: 4DREAM CO., LTD., Andong-si (KR)

( * ) Notice: Subject to any disclaimer, the term of this patent is extended or adjusted under 35 U.S.C. 154(b) by 121 days.

(21) Appl. No.: 16/324,965

(22) PCT Filed: Sep. 29, 2017

(86) PCT No.: PCT/KR2017/010930
§ 371 (c)(1),
(2) Date: Feb. 12, 2019

(87) PCT Pub. No.: WO2018/030880
PCT Pub. Date: Feb. 15, 2018

(65) Prior Publication Data
US 2019/0227557 A1      Jul. 25, 2019

(30) Foreign Application Priority Data
Aug. 12, 2016   (KR) .................. 10-2016-0102780

(51) Int. Cl.
*B64C 39/02*      (2006.01)
*B64D 47/08*      (2006.01)
(Continued)

(52) U.S. Cl.
CPC ............ *B64C 39/024* (2013.01); *B64C 39/02* (2013.01); *B64D 45/00* (2013.01); *B64D 47/00* (2013.01);
(Continued)

(58) Field of Classification Search
CPC ............ B64C 39/024; B64C 2101/127; B64C 2101/146; B64D 47/08; H04W 12/0013; G05D 1/0094; G08G 5/003
(Continued)

(56) References Cited

U.S. PATENT DOCUMENTS 9,317,036 B2      4/2016   Wang et al.
9,412,278 B1 *    8/2016   Gong ................... G08G 5/0091
(Continued)

FOREIGN PATENT DOCUMENTS

| | | |
|---|---|---|
| JP | 2003-127994 A | 5/2003 |
| JP | 2007-237873 A | 9/2007 |
| JP | 2014-177162 A | 9/2014 |

OTHER PUBLICATIONS

Office Action of Korean Application No. 10-2016-0102780 dated Nov. 17, 2016.
(Continued)

*Primary Examiner* — Yazan A Soofi
(74) *Attorney, Agent, or Firm* — Sughrue Mion, PLLC

(57) ABSTRACT

An unmanned aerial vehicle according to an embodiment of the present disclosure includes a storing part configured to store information regarding a geo-fence area, and flight approval information or shooting approval information of a main body of the unmanned aerial vehicle with respect to the geo-fence area; and a controller configured to, when the main body approaches the geo-fence area, extract approval code from the flight approval information or the shooting
(Continued)

approval information, and release at least one of a flight mode and a shooting mode prohibited in the geo-fence area.

5 Claims, 5 Drawing Sheets

(51) Int. Cl.
*G08G 5/00* (2006.01)
*B64D 47/00* (2006.01)
*B64D 45/00* (2006.01)
*H04L 9/00* (2006.01)
*H04W 12/033* (2021.01)
*H04W 12/041* (2021.01)
*H04W 12/63* (2021.01)
*H04W 12/086* (2021.01)
*G05D 1/00* (2006.01)

(52) U.S. Cl.
CPC ........... *B64D 47/08* (2013.01); *G05D 1/0094* (2013.01); *G08G 5/003* (2013.01); *G08G 5/006* (2013.01); *G08G 5/0013* (2013.01); *G08G 5/0021* (2013.01); *G08G 5/0069* (2013.01); *G08G 5/0086* (2013.01); *H04L 9/00* (2013.01); *H04W 12/033* (2021.01); *H04W 12/041* (2021.01); *H04W 12/086* (2021.01); *H04W 12/63* (2021.01); *B64C 2201/127* (2013.01); *B64C 2201/146* (2013.01)

(58) Field of Classification Search
USPC .............................................................. 701/3
See application file for complete search history.

(56) References Cited

U.S. PATENT DOCUMENTS

| | | | |
|---|---|---|---|
| 9,936,442 B1* | 4/2018 | Noonan | C10G 2/33 |
| 2015/0254988 A1* | 9/2015 | Wang | B64D 47/08 |
| | | | 701/3 |
| 2016/0070261 A1* | 3/2016 | Heilman | B64C 39/024 |
| | | | 701/2 |
| 2017/0148328 A1* | 5/2017 | Chan | G08G 5/006 |
| 2018/0068567 A1* | 3/2018 | Gong | G08G 5/0034 |
| 2020/0020236 A1* | 1/2020 | Zhou | G08G 5/006 |

OTHER PUBLICATIONS

International Search Report of PCT/KR2017/010930 dated Feb. 5, 2018 [PCT/ISA/210].

* cited by examiner

UNMANNED AERIAL VEHICLE INCLUDING FLIGHT AND PHOTOGRAPHING CONTROL DEVICE

TECHNICAL FIELD

Embodiments of the present disclosure relate to an unmanned aerial vehicle having a function of controlling flight and shooting in a specific region.

BACKGROUND ART

In general, an unmanned aerial vehicle refers to an unmanned airplane or helicopter-like vehicle, also called a drone, which is configured to fly by induction of radio waves. Drones were originally used as targets for practice shooting of air force planes, anti-aircraft guns, or missiles in place of enemy planes but have been developed as reconnaissance planes with the development of wireless technology and thus have been used to penetrate deep into enemy lines for reconnaissance and surveillance purposes.

Recently, drones have been also used as attack planes by mounting various weapons such as a missile thereon. Aerial vehicles having various sizes and performance levels have been developed according to the purposes of drones. Research has been actively conducted on not only large-scale military aerial vehicles but also miniature drones.

Many drones have been developed and commercialized for personal hobbies. In addition, drones have been put into operation in areas that are not accessible to humans, such as jungles, the backwoods, volcanic areas, natural disaster areas, or nuclear power plant accident areas. In recent years, a range of application of drones has been continuously increased, including transport purposes.

Actually, the number of cases in which drones are introduced to enhance the security of movies, performances and important events is increasing. Especially, Amazon's Prime Air is becoming a catalyst for popularizing drones. Amazon is aiming at introducing a system for delivering goods weighing up to 5 pounds to a region no more than 10 miles away by loading a drone with the goods.

As drones are attracting attention in the private market as described above, inexpensive drones are being produced for personal entertainment and hobbies. On an extension of military drones, drones can be used in various fields. For example, a drone can be used to manage and monitor a particular area inaccessible to humans. Specifically, the drone can monitor a specific area remotely through a camera or sensor mounted thereon while moving freely and quickly. That is, the drone can be used for public purposes such as survivor search, forest fire monitoring, traffic violation control, crime-ridden districts and border area surveillance, etc.

However, as the use of drones is sharply increasing, even in a licensed drone flight region, problems such as management of facilities such as high-voltage lines and high-speed railways exposed in everyday living environments and a risk of invasion of common people's privacy may become serious. Security problems may arise when a drone flies freely in key facility such as a military area or a power plant or is shooting pictures freely over the key facility.

In the case of unmanned aerial vehicles with a probability of accident which is 10 to 100 times higher than that of manned aerial vehicles, technology to reduce accidents for manned aerial vehicles and autonomous control technology are desperately needed, starting from an early market stage. As use of drones for missions and drones for leisure is increasing, restricted area control automation technology for flight safety and illegal drone control and management are necessary to proactively take safety measures and vitalize unmanned aerial vehicle industry.

Accordingly, a method of controlling drones by securing autonomous drone flight control-based technology to ensure safe drone operational conditions and protect privacy may be considered.

DETAILED DESCRIPTION OF THE INVENTION

Technical Problem

One aspect of the present disclosure provides an unmanned aerial vehicle having a more improved structure and multiple functions.

Another aspect of the present disclosure provides an autonomous drone control method of securing a minimum safety management system to ensure free unmanned flight and aerial shooting without regulation in a free drone flight zone or more effectively controlling unmanned aerial vehicles flying around key facilities.

Technical Solution

According to an embodiment of the present disclosure, a unmanned aerial vehicle includes a storing part configured to store information regarding a geo-fence area, and flight approval information or shooting approval information for a main body of the unmanned aerial vehicle with respect to the geo-fence area; and a controller configured to, when the main body approaches the geo-fence area, extract approval code from the flight approval information or the shooting approval information, and release at least one of a flight mode and a shooting mode prohibited in the geo-fence area.

In one embodiment, the unmanned aerial vehicle may further includes a communication part configured to communicate with a user terminal; and a collected information sealing part configured to store flight information regarding a flight in the flight mode or image information regarding an image captured in the shooting mode in the storing part, and encrypt the flight information or the image information by applying thereto an encryption key received from the user terminal.

In one embodiment, the encryption key and a decryption key for decrypting the encrypted information may be received from an integrated server connected to the user terminal.

In one embodiment, when the flight or shooting is ended, the controller may transmit at least a portion of the flight information and the image information to the integrated server.

In one embodiment, the transmission or storing of the captured image may be performed in a non-geo-fence area or be performed in the geo-fence area only under an approval condition included in the approval information.

In one embodiment, the unmanned aerial vehicle may further include a sensor installed on the main body and configured to sense a position and altitude of the main body. When the position or altitude of the main body is not identified, the controller may prohibit the captured image from being transmitted via the communication part or from being stored in the storing part.

In one embodiment, the controller may respond in real time to the integrated server with respect to an identification request from a control server controlling flight or shooting in the geo-fence area, based on previously authorized information.

According to another embodiment of the present disclosure, an unmanned aerial vehicle includes a sensor configured to sense a position and altitude of a man body of the unmanned aerial vehicle, the sensor being installed on the main body; a communication part configured to transmit information regarding a geo-fence area to a user terminal when the sensed position and altitude represents that the unmanned aerial vehicle approaches the geo-fence area; and a controller configured to extract approval code from approval information previously stored or received via the communication part, and release at least one of a flight mode and a shooting mode prohibited in the geo-fence area.

Advantageous Effects of the Invention

An unmanned aerial vehicle according to one or more embodiments of the present disclosure configured as described above is capable of controlling flight and shooting in a set geo-fence area. The unmanned aerial vehicle may be basically controlled using pre-approval technology.

Furthermore, even if shooting is performed without permission, a captured image can be prevented from being transmitted or stored.

Encryption and decryption of the captured image are controlled according to whether the image is captured or not in a drone flight permission zone and whether the capturing of the image is notified in advance, thereby reinforcing security and aerial shooting control means for key facilities in the geo-fence area.

Furthermore, the flight and image shooting of a large number of unmanned air vehicles can be controlled by an integrated server, and autonomous navigation regions of the unmanned aerial vehicles can be selected, thereby obtaining data regarding the identification and use of the unmanned aerial vehicles.

An unmanned aerial vehicle may include a drone flight control module to which geo-fence technology is applied to manage a flight history for autonomous control of the entry of the unmanned aerial vehicle into a restricted airspace and limit aerial shooting that may infringe privacy, thereby enhancing the stability of operating the unmanned aerial vehicle.

In addition, when a method of controlling the flight and aerial shooting of an unmanned aerial vehicle is used, a system for integrated management of unmanned flight information and control of aerial shooting may be easily built as an unmanned aerial vehicle transport system to obtain a minimum control means necessary for safe use of unmanned air vehicles, and may be used for fundamental technology for identifying an aerial shot captured by an unauthorized drone or an unauthorized aerial shot captured by an authorized drone.

MODE OF THE INVENTION

Figure 1:
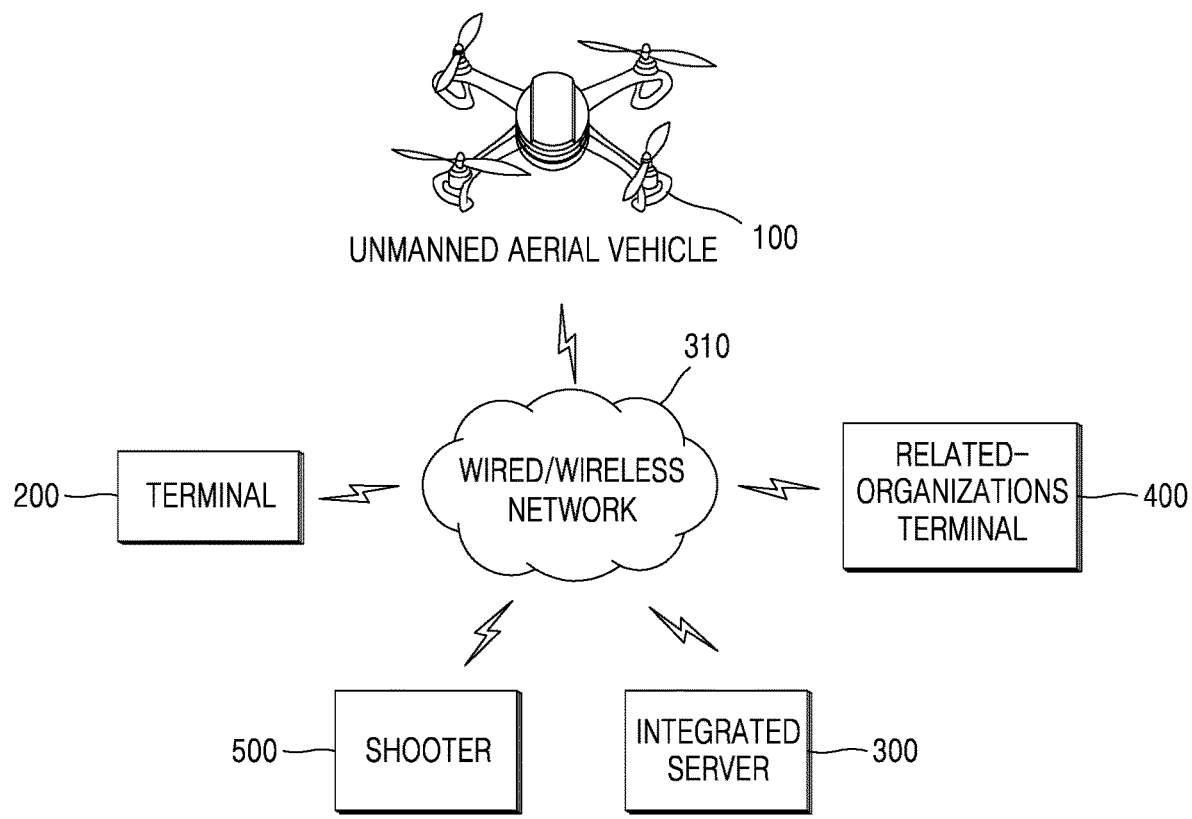
FIG. 1 is a conceptual diagram of an unmanned aerial vehicle navigation system according to an embodiment of the present disclosure.

Hereinafter, an unmanned aerial vehicle according to the present disclosure will be described in detail with reference to the accompanying drawings. As used herein, terms such as "module" and "unit" used to describe elements are selected or interchangeably used only for convenience of explanation and thus should not be understood as having different meanings or roles. In this specification, the same or similar reference numerals are given to even different embodiments having the same or similar configurations and are not redundantly described herein. As used herein, the singular forms "a", "an" and "the" are intended to include the plural forms as well, unless the context clearly indicates otherwise.

FIG. 1 is a conceptual diagram of an unmanned aerial vehicle navigation system according to an embodiment of the present disclosure.

Referring to FIG. 1, an unmanned aerial vehicle navigation system 1000 includes an unmanned aerial vehicle 100, a user terminal 200, an integrated server 300, a related-organizations terminal 400, and a shooter 500.

The unmanned aerial vehicle 100 is configured to be controlled remotely without human on board. A structure of the unmanned aerial vehicle 100 will be described in detail with reference to FIG. 2 below.

The user terminal 200 may be understood to mean a smartphone, a drone dedicated pilot terminal, or both. The user terminal 200 may be configured to remotely control the unmanned air vehicle 100 or to control any of functions of the unmanned air vehicle 100. A communication method between the unmanned air vehicle 100 and the user terminal 200 is not limited, provided that the communication method is a wireless communication method such as Wi-Fi, Bluetooth, or WiBro. The user terminal 200 may be used to control the unmanned aerial vehicle 100, communicate with the unmanned air vehicle 100, or collect information, such as approval information or information regarding a geo-fence area, from the integrated server 300. Flight information or shooting information may be received from the unmanned aerial vehicle 100, and transmitted to the integrated server 300. The user terminal 200 may mediate between the unmanned aerial vehicle 100 and the integrated server 300. An encrypted image may be decrypted through the user terminal 200.

The integrated server 300 may include a control server and a key server. The integrated server 300 may be included in a control center. Through the integrated server 300, data regarding a geo-fence area may be collected, the unmanned aerial vehicle 100 may be registered, accessing to or performing shooting in the geo-fence area may be permitted, flight record and shooting record of the registered unmanned aerial vehicle 100 may be managed, an encryption key and a decryption key may be managed, and the geo-fence area may be controlled in real time.

The integrated server 300 may transmit a command to control the unmanned aerial vehicle 100 or receive image information obtained by the unmanned aerial vehicle 100 while transmitting data to or receiving data from the unmanned aerial vehicle 100 via a wired network and/or wireless network.

For example, the integrated server 300 may be embodied as a computing device that a user owns, e.g., a smartphone, a tablet computer, a notebook computer, or a desktop computer. Alternatively, the integrated server 300 may be embodied as a server operated by a service provider, so that a plurality of unmanned aerial vehicles 100 may be controlled by the server.

The integrated server 300 and the unmanned aerial vehicle 100 may communicate with each other through satellite communication, but are not limited thereto and may be configured to communicate with each other by any communication method selected from the group consisting of a LAN, a Metropolitan Area Network (MAN), a Global System for Mobile Network (GSM), an Enhanced Data GSM Environment (EDGE), High-Speed Downlink Packet Access (HSDPA), Wideband Code Division Multiple Access (W-CDMA), Code Division Multiple Access (CDMA), Time Division Multiple Access (TDMA), Bluetooth, Zigbee, Voice over Internet Protocol (VoIP), LTE Advanced, IEEE802.16m, Wireless MAN-Advanced, HSPA+, 3GPP Long Term Evolution (LTE), Mobile WiMAX (IEEE 802.16e), UMB (formerly, EV-DO Rev. C), Flash-OFDM, iBurst and MBWA (IEEE 802.20) systems, HIPERMAN, Beam-Division Multiple Access (BDMA), World Interoperability for Microwave Access (Wi-MAX), and ultrasonic communication.

The related-organizations terminal 400 may be provided in a related organization. Such related organizations may include a government office, a police station, a power station, a military unit, and the like. The related-organizations terminal 400 may be embodied as a smartphone, a tablet computer, a notebook computer, a desktop computer, or a server.

The related organization may manage at least one key facility and set up a geo-fence area to protect the key facility. Information regarding the geo-fence area may be collected and stored in the integrated server 300 or at least a part thereof may be stored in the unmanned aerial vehicle 100 or the user terminal 200.

The geo-fence area may include a plurality of fence regions. For example, a first fence region may be a region in which flight is prohibited, and a second fence region may be a region in which flight is permitted but shooting is prohibited. When an unauthorized unmanned aerial vehicle 100 approaches the first fence region, the related organization may sense the approaching of the unauthorized unmanned aerial vehicle 100, and warn the unauthorized unmanned aerial vehicle 100 or shoot down the unauthorized unmanned aerial vehicle 100 through the shooter 500. An operation of the shooter 500 may be controlled by the related-organizations terminal 400 or the integrated server 300.

Figure 2:
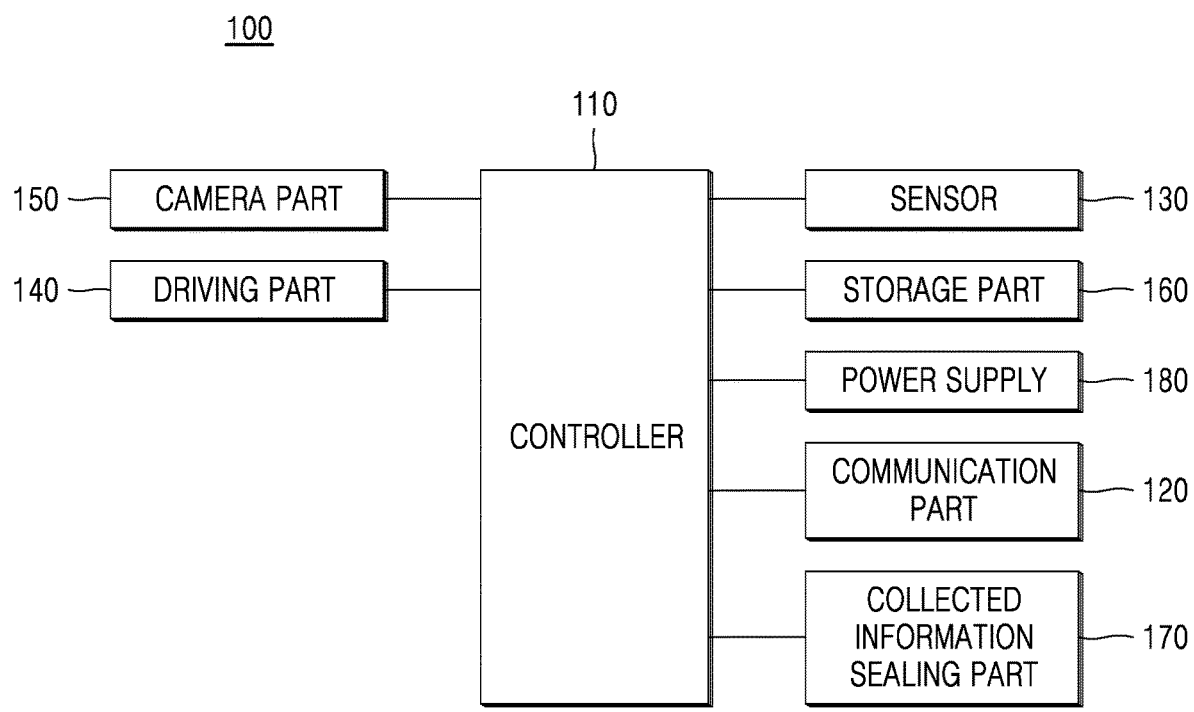
FIG. 2 is a block diagram of an unmanned aerial vehicle.
Figure 3:
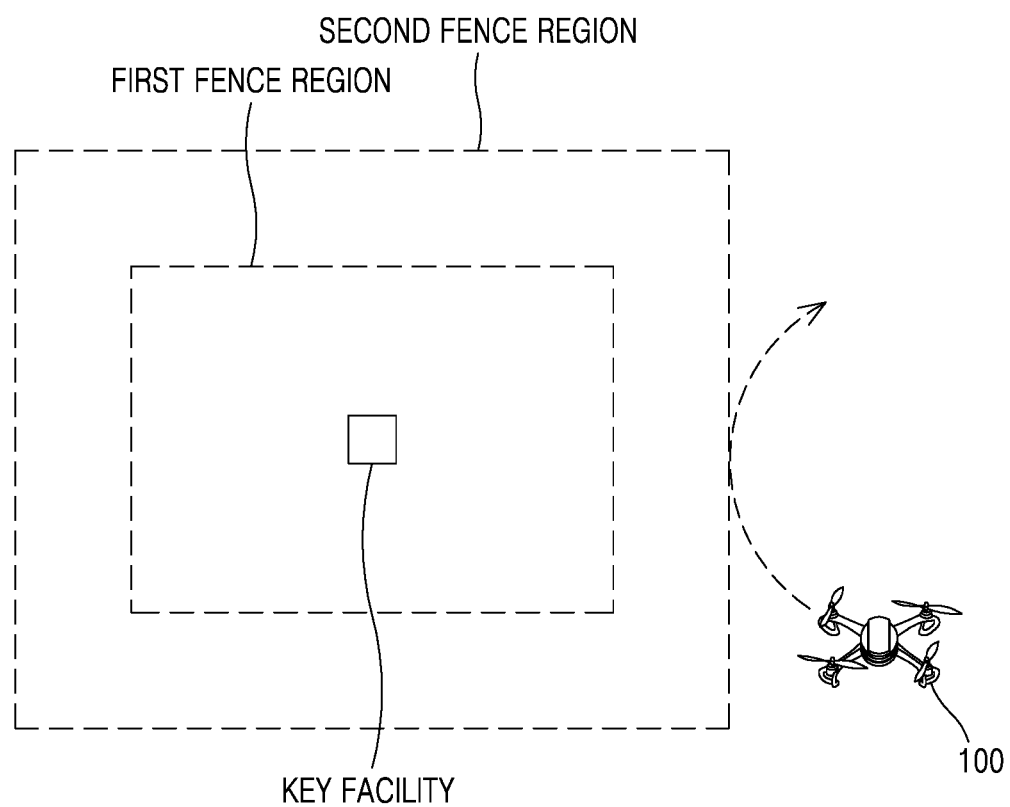
FIGS. 3 and 4 are diagrams illustrating an example of controlling an unmanned aerial vehicle according to an embodiment of the present disclosure.
Figure 4:
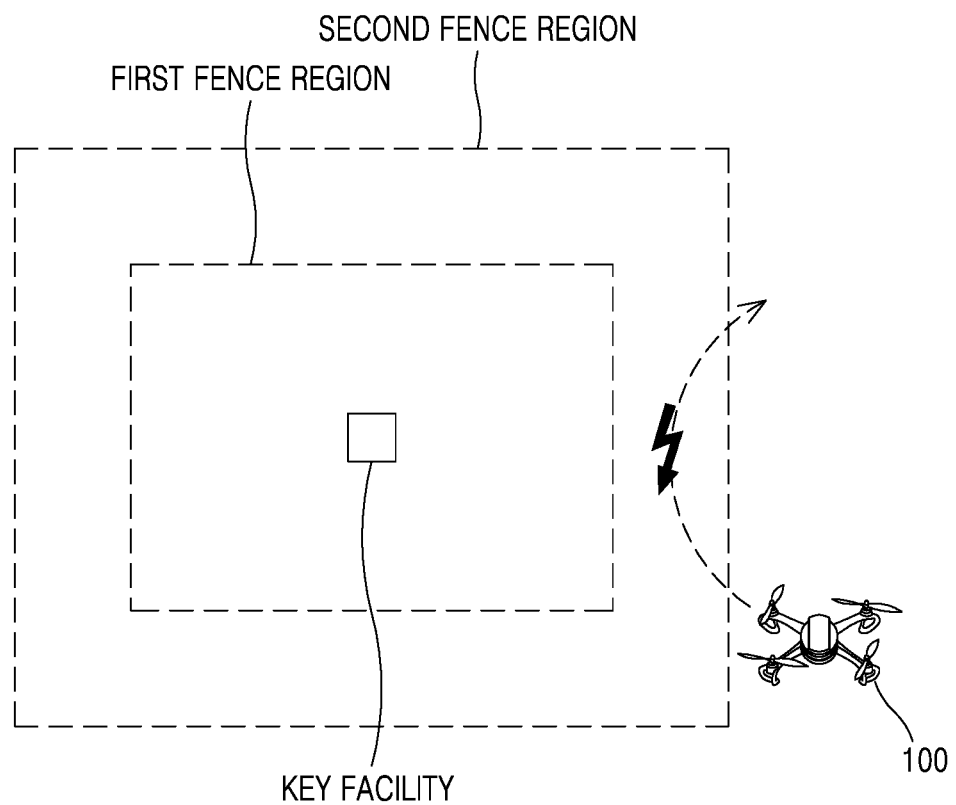

FIG. 2 is a block diagram of an unmanned aerial vehicle. FIGS. 3 and 4 are diagrams illustrating an example of controlling an unmanned aerial vehicle according to an embodiment of the present disclosure.

Referring to FIG. 2, an unmanned aerial vehicle 100 includes a controller 110, a communication part 120, a sensor 130, a driving part 140, and a camera part 150. A main body of the unmanned aerial vehicle 100 may be configured to accommodate at least one of the above-described components. The driving part 140 may be attached to or combined with the main body of the unmanned aerial vehicle 100.

The controller 110 is operated according to an external control signal, or calculates a target position and orientation of the unmanned aerial vehicle 100 according to an internal predetermined operation, generates a control command corresponding to the target position and orientation, and transmits the control command to the driving part 140.

The communication part 120 receives a control signal instructing a user to control the unmanned aerial vehicle 100 from an external user terminal 200, transmits the control signal to the controller 110, and transmits an image captured by the camera part 150 to the user terminal 200.

The sensor 130 includes an acceleration sensor, a gyro sensor, a reception module for a global navigation satellite system (GNSS), or the like, and measures the speed, acceleration, rotation angle, position, altitude, etc. of the unmanned aerial vehicle 100 and provides a result of the measurement to the controller 110. A GPS, Glonass, BeiDou, Galileo, Vader, QZSS, IRNSS or the like may be used as the GNSS. That is, information, e.g., the position, altitude, etc., of the unmanned aerial vehicle 100 may be identified by the sensor 130. The driving part 140 of the unmanned aerial vehicle 100 includes a plurality of motors and a propeller, and receives a control command from the controller 110 and drives the motors to rotate the propellers so as to control the unmanned aerial vehicle 100 to fly.

The camera part 150 includes a camera for capturing a picture of an object on the ground or in the air, and is configured to adjust panning or tilting of the camera. The camera part 150 may receive a signal related to photographing or control of panning or tilting of the camera from the user terminal 200, and perform photographing or adjust panning or tilting of the camera. Alternatively, the camera part 150 may perform photographing or adjust the panning or tilting of the camera under control of the controller 110. In this case, the controller 110 may perform general management of the position and direction of the unmanned aerial vehicle 100 and the panning or tilting of the camera, thereby facilitating a user's manipulation of the unmanned aerial vehicle 100 and easily obtaining an image that a user wants.

A power supply 180 is configured to be chargeable and dischargeable, and transmits information related to power shortage to the user terminal 200 when the power supply 180 is discharged to a certain level or more.

A storage part 160 may store information regarding a geo-fence area, flight approval information, shooting approval information, etc.

The information regarding the geo-fence area includes information regarding an area in which flight and shooting are permitted, a region of the area in which flight is prohibited, a region of the area in which shooting is prohibited, a maximum-altitude and minimum-altitude restricted region of the area, and a maximum altitude limit set by law. In the geo-fence area, the flight of an unmanned aerial vehicle may be permitted but shooting may be prohibited or both the flight and shooting of the unmanned aerial vehicle may be prohibited.

Such information may be received from the user terminal 200 or the integrated server 300. The storage part 160 may further store flight information according to a flight mode or image information according to a shooting mode. The flight information or the image information is encrypted and stored. To this end, a collected information sealing part 170 may be provided to encrypt the flight information or the image information. The image information may be an image file, and may include additional information such as the date, file size, file name, shooting time, storage time, storage location, or storage period of the image file, information regarding the camera or the unmanned aerial vehicle 100, information regarding a place in which shooting was performed, etc.

The collected information sealing part 170 receives an encryption key from the user terminal 200 or the integrated server 300. The collected information sealing part 170 generates encrypted data by applying an encryption approval mechanism such as SHA-256 having a key of 256 bytes or more to the image file, and stores the encrypted data in the storage part 160 or transmits the encrypted data to the user terminal 200. The collection information sealing unit 170 may read a stored image file in real time or at intervals of time (e.g., at intervals of 10 minutes or 1 hour), and encrypt the image file by using a predetermined encryption mechanism.

The collected information sealing part 170 encrypts image information data collected by the camera part 150. In addition to the image information data, a serial number of the camera part 150, information regarding time when each data was stored, and information regarding a storage region of each data may be further used to increase the reliability of the image information data that is input in an encryption process.

Encrypted information may be decrypted using a decryption key.

The integrated server 300 may additionally include a key server which generates and stores an encryption key and a decryption key.

The controller 110 continuously senses the position and altitude of the main body of the unmanned aerial vehicle 100 through the sensor 130. When the position or altitude of the main body represents that the unmanned aerial vehicle 100 approaches the geo-fence area, approval information stored in the storage part 160 or received via the communication part 120 is called. At this time, a proximity distance to the geo-fence area may be set. For example, the proximity distance may be 5 m, 10 m, or the like. When the approval information includes approval code for the flight mode or the shooting mode in the geo-fence area, at least one of the flight mode and the shooting mode prohibited in the geo-fence area is released. For example, in the second fence region in which flight is permitted but shooting is prohibited, only the flight mode is permitted and thus the flight mode is released. In this case, the controller 110 transmits the approval code to the integrated server 300 via the communication unit 120.

The controller 110 may continuously sense the position and altitude of the main body through the sensor 130 and prohibit the released flight mode or shooting mode.

As illustrated in FIGS. 3 and 4, when the unmanned aerial vehicle 100 approaches the geo-fence area, the controller 110 extracts the approval code from approval information stored in the storage part 160 or received through communication, and releases the prohibited flight mode or shooting mode. When there is no approval code, an access prohibition signal or message is transmitted to the user terminal 200 via the communication part 120 and flight or shooting is prohibited in the geo-fence area. When flight or shooting is performed in the geo-fence area without approval, information related to this fact is transmitted to the integrated server 300.

The integrated server 300 may continuously request to identify the unmanned aerial vehicle 100 located in or approaching the geo-fence area. The controller 110 responds to the request in real time in an approved state. The responding to the request may be performed automatically.

When the position or altitude of the main body is not sensed by the sensor 130, the controller 110 stops the operation of the camera part 150 and prohibits storing or transmission of a captured image.

Furthermore, the controller 110 controls the camera part 150, the storage part 160, and the communication part 120 to perform storing or transmission of a captured image in a non-geo-fence area or only under an approval condition included in the approval information.

When flight or shooting is ended, the controller 110 transmits at least a portion of flight information or image information to the integrated server 300. This information may be encrypted and transmitted to the integrated server 300.

Data may be transmitted to or received from the integrated server 300 via the user terminal 200.

Figure 5:
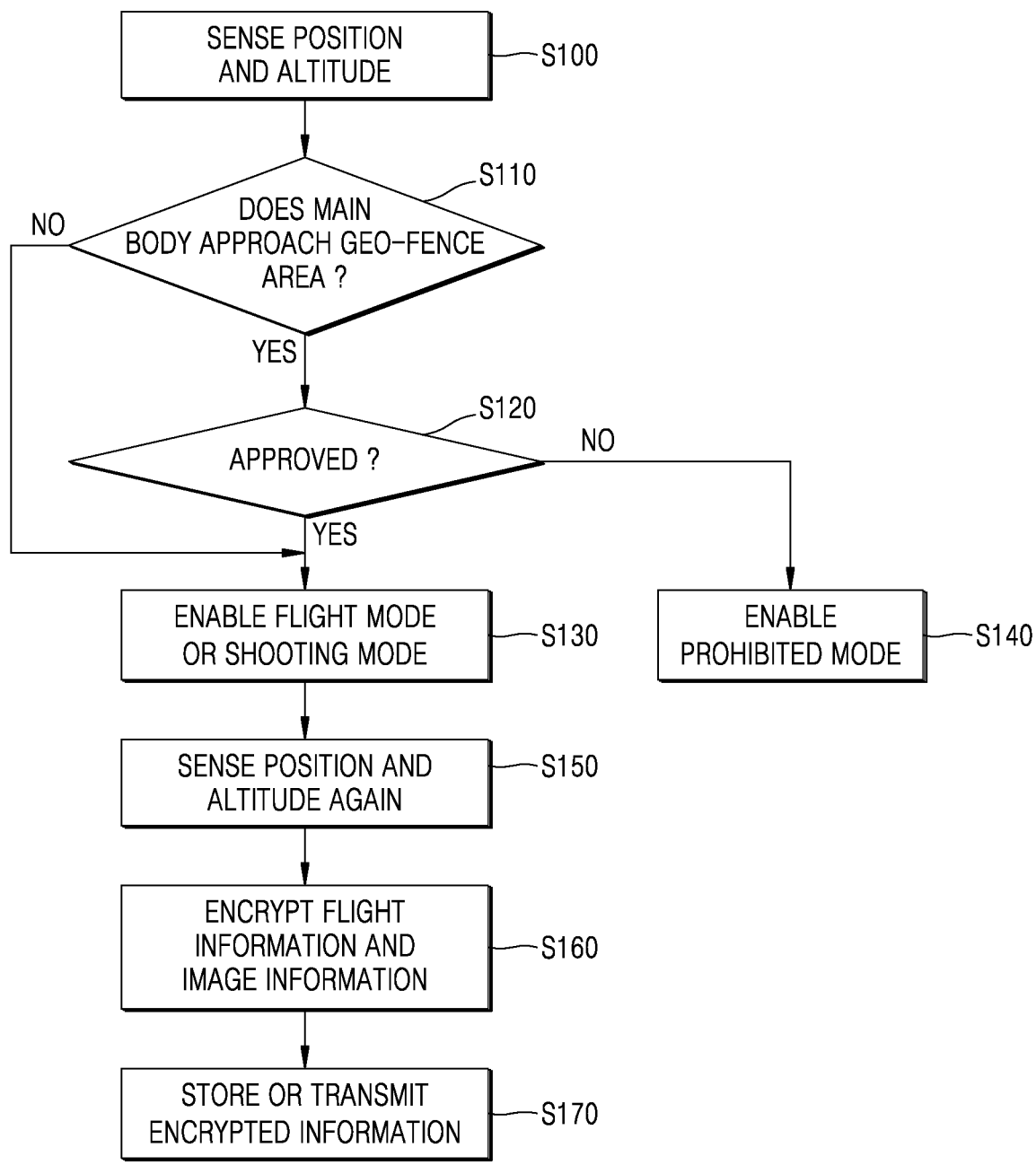
FIG. 5 is a diagram illustrating an example of controlling flight and shooting of an unmanned aerial vehicle according to an embodiment of the present disclosure.

FIG. 5 is a diagram illustrating an example of controlling flight and shooting of an unmanned aerial vehicle 100 according to an embodiment of the present disclosure.

A user may obtain prior approval with respect to a place where flight or shooting will be performed before flight or shooting is performed. Even when there is no prior approval, when a flight or shooting prohibition mode is set, an approval request may be made to the integrated server 300 to release the flight or shooting prohibition mode.

The unmanned aerial vehicle 100 senses the position and altitude of the main body through the sensor 130. Flight or shooting may be freely performed outside the geo-fence area. Information regarding the flight or shooting outside the geo-fence area may also be encrypted according to a user's selection, and a portion thereof may be transmitted to the integrated server 300.

When the main body approaches a predetermined distance or less from the geo-fence area, the controller 110 extracts approval code from approval information stored in the storage part 160 or received through the communication part 120. When there is no approval code, a prohibition mode is enabled. That is, the flight mode or the shooting mode is prohibited. When the flight mode or the shooting mode is prohibited, an access or shooting prohibition signal or message is transmitted to the user terminal 200. In addition, information related thereto may be transmitted to the integrated server 300.

When approval code is present, the prohibited flight or shooting mode is released. While the flight mode or the shooting mode is permitted, the position or altitude of the main body is continuously sensed. When the position or altitude is beyond an allowable range during the sensing of the position or altitude of the main body, the flight or shooting mode may be prohibited again. When the position or altitude of the main body is not sensed, the permitted flight or shooting mode may be prohibited again.

At least a portion of information collected in the flight mode or the shooting mode may be encrypted, and the encrypted information may be stored or transmitted to the user terminal 200 or the integrated server 300.

The above-described unmanned aerial vehicle is not limited to the configurations and the methods employed in the embodiments set forth herein, and various modification may be made in the embodiments through selective combination of all or some thereof.

INDUSTRIAL APPLICABILITY

The present disclosure is applicable to industries related to unmanned aerial vehicles.

The invention claimed is:
1. An unmanned aerial vehicle, of which flight and shooting in a geo-fence area are controlled through an integrated server, comprising:

a memory configured to store information regarding the geo-fence area, and flight approval information or shooting approval information for a main body of the unmanned aerial vehicle with respect to the geo-fence area;

a controller configured to, when the main body approaches the geo-fence area, extract approval code from the flight approval information or the shooting approval information, and release at least one of a flight mode and a shooting mode prohibited in the geo-fence area;

a wireless communicator configured to communicate with a user terminal; and an encryptor configured to encrypt flight information regarding a flight, in the geo-fence area, in the flight mode or image information regarding an image captured, in the geo-fence area, in the shooting mode by applying thereto an encryption key received from the user terminal or the integrated server, that is connected to the user terminal, wherein a decryption key for decrypting the encrypted information is received from the integrated server connected to the user terminal, and wherein the flight information or the image information encrypted by the encryptor is stored in the memory or transmitted to the user terminal.

2. The unmanned aerial vehicle of claim 1, wherein, when the flight or shooting is ended, the controller transmits at least a portion of the flight information and the image information to the integrated server.

3. The unmanned aerial vehicle of claim 2, wherein the transmission or storing of the captured image is performed in a non-geo-fence area or is performed in the geo-fence area only under an approval condition included in the flight approval information or the shooting approval information.

4. The unmanned aerial vehicle of claim 1, further comprising a sensor configured to sense a positon and an altitude of the main body, the sensor being installed on the main body, and wherein, when the position or the altitude of the main body is not identified, the controller prohibits the captured image from being transmitted via the wireless communicator or from being stored in the memory.

5. The unmanned aerial vehicle of claim 1, wherein the controller responds in real time to the integrated server with respect to an identification request from a control server controlling flight or shooting in the geo-fence area, based on previously authorized information.

* * * * *